(12) United States Patent
Bifulco et al.

(10) Patent No.: US 11,686,220 B2
(45) Date of Patent: Jun. 27, 2023

(54) H-FRAME CONNECTION BETWEEN FAN CASE AND CORE HOUSING IN A GAS TURBINE ENGINE

(71) Applicant: Raytheon Technologies Corporation, Farmington, CT (US)

(72) Inventors: Anthony R. Bifulco, Ellington, CT (US); David A. Topol, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/700,992

(22) Filed: Mar. 22, 2022

(65) Prior Publication Data

US 2023/0151742 A1 May 18, 2023

Related U.S. Application Data

(60) Provisional application No. 63/278,812, filed on Nov. 12, 2021.

(51) Int. Cl.

| *F01D 25/28* | (2006.01) |
|---|---|
| *F01D 25/24* | (2006.01) |
| *F01D 9/04* | (2006.01) |

(52) U.S. Cl.
CPC ............. *F01D 25/28* (2013.01); *F01D 9/041* (2013.01); *F01D 25/24* (2013.01);
(Continued)

(58) Field of Classification Search
CPC .......... F01D 25/28; F01D 25/24; F01D 9/041; F05D 2240/126; F05D 2240/14;
(Continued)

(56) References Cited

U.S. PATENT DOCUMENTS

| 3,398,535 A | 8/1968 | Campbell et al. |
| 3,421,577 A * | 1/1969 | Valyi ................... B21D 53/045 165/170 |

(Continued)

FOREIGN PATENT DOCUMENTS

| EP | 0761931 A1 | 3/1997 |
| EP | 2299067 A2 | 3/2011 |

(Continued)

OTHER PUBLICATIONS

European Search Report for EP Application No. 22207341.3 dated Apr. 12, 2023.

*Primary Examiner* — Igor Kershteyn
(74) *Attorney, Agent, or Firm* — Carlson, Gaskey & Olds, P.C.

(57) ABSTRACT

A gas turbine engine includes a fan rotor driven by a fan drive turbine about an axis through a gear reduction to reduce a speed of the fan rotor relative to a speed of the fan drive turbine. A fan case surrounds the fan rotor, and a core engine with a compressor section, including a low pressure compressor. The fan rotor delivers air into a bypass duct defined between the fan case and the core engine. A rigid connection between the fan case and the core engine includes a plurality of H-frame connecting members rigidly connected to the fan case, and to the core engine. The H-frame connecting members each are defined by two rigid legs which extend between the fan case and to the core engine, along directions which are generally parallel to each other. A plurality of non-structural fan exit guide vanes and the non-structural fan exit guide vanes are provided with an acoustic feature to reduce noise. The non-structural fan exit guide vanes are rigidly mounted to at least one of the fan case and the core engine.

20 Claims, 6 Drawing Sheets

(52) U.S. Cl.
CPC .... *F05D 2240/126* (2013.01); *F05D 2240/14* (2013.01); *F05D 2250/75* (2013.01); *F05D 2260/30* (2013.01); *F05D 2260/606* (2013.01); *F05D 2260/96* (2013.01)

(58) Field of Classification Search
CPC ............. F05D 2250/75; F05D 2260/30; F05D 2260/606; F05D 2260/96
See application file for complete search history.

(56) References Cited

U.S. PATENT DOCUMENTS

| | | | |
|---|---|---|---|
| 3,820,628 A * | 6/1974 | Hansons | F02K 1/827 |
| | | | 181/220 |
| 5,409,184 A | 4/1995 | Udall et al. | |
| 5,740,674 A | 4/1998 | Beutin et al. | |
| 6,139,259 A | 10/2000 | Ho et al. | |
| 7,654,075 B2 | 2/2010 | Udall | |
| 8,979,491 B2 | 3/2015 | Heyerman et al. | |
| 9,032,740 B2 | 5/2015 | Journade et al. | |
| 9,784,129 B2 | 10/2017 | Eleftheriou et al. | |
| 10,190,501 B2 | 1/2019 | Bagnall | |
| 11,555,420 B1 * | 1/2023 | Bifulco | F01D 25/24 |
| 2005/0135924 A1 * | 6/2005 | Prasad | F01D 5/16 |
| | | | 415/115 |
| 2008/0295518 A1 * | 12/2008 | Reba | F02C 7/24 |
| | | | 60/725 |
| 2013/0084174 A1 | 4/2013 | Maalouf et al. | |
| 2013/0195610 A1 * | 8/2013 | Rose | F01D 9/02 |
| | | | 415/115 |
| 2018/0030926 A1 * | 2/2018 | Eckett | F02K 1/72 |
| 2020/0088136 A1 * | 3/2020 | Soria | F02C 7/045 |
| 2022/0049621 A1 * | 2/2022 | Sawyers-Abbott | F01D 25/162 |

FOREIGN PATENT DOCUMENTS

| | | |
|---|---|---|
| EP | 2366871 A1 | 9/2011 |
| EP | 2578813 A1 | 4/2013 |
| EP | 3018304 A1 | 5/2016 |
| EP | 3179071 A1 | 6/2017 |
| FR | 3062876 B1 | 8/2018 |

* cited by examiner

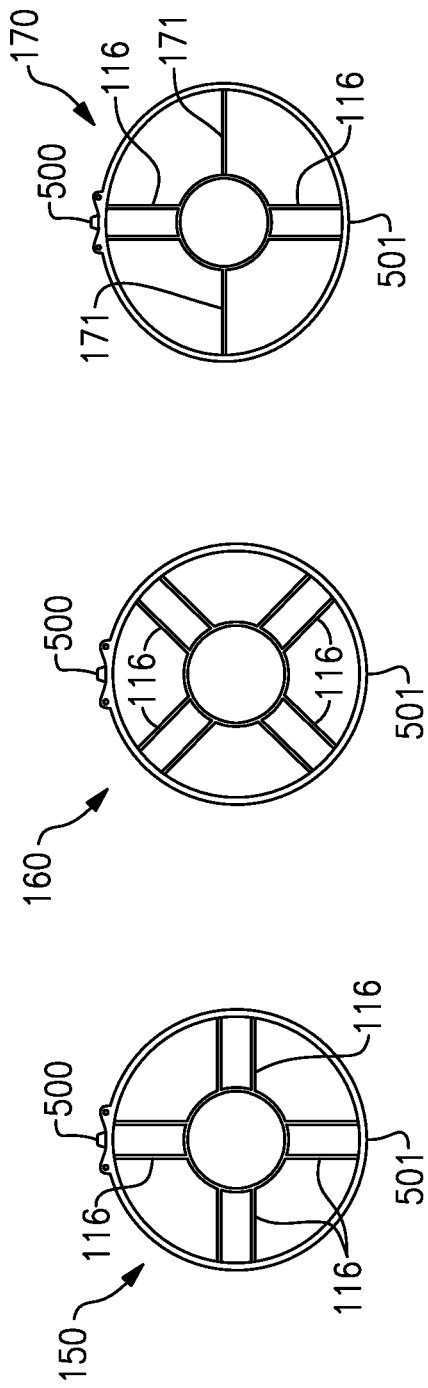

H-FRAME CONNECTION BETWEEN FAN CASE AND CORE HOUSING IN A GAS TURBINE ENGINE

CROSS-REFERENCE TO RELATED APPLICATIONS

This application claims priority to U.S. Provisional Application No. 63/278,812 filed Nov. 12, 2021.

BACKGROUND OF THE INVENTION

This application relates to incorporating frame connections and fan exit guide vanes connections between a fan case and a core housing in a gas turbine engine.

Gas turbine engines are known, and typically include a fan delivering air into a bypass duct as propulsion air, and into a core engine housing. The core engine housing houses a compressor section. The air is compressed and delivered into a combustor where it is mixed with fuel and ignited. Products of this combustion pass downstream over turbine rotors, driving them to rotate. The turbine rotors in turn rotate the fan and compressor rotors.

Historically the fan rotor was fixed to rotate at the same speed as a fan drive turbine rotor, which may also drive a low pressure compressor rotor. More recently a gear reduction has been incorporated between the fan drive turbine and the fan rotor, allowing the fan rotor to rotate at slower speeds than the fan drive turbine.

In modern gas turbine engines with such a gear reduction the fan case has been fixed to the core housing through a plurality of fan exit guide vanes, which provide the structural support between the fan case and the inner core housing.

SUMMARY OF THE INVENTION

In a featured embodiment, a gas turbine engine includes a fan rotor driven by a fan drive turbine about an axis through a gear reduction to reduce a speed of the fan rotor relative to a speed of the fan drive turbine. A fan case surrounds the fan rotor, and a core engine with a compressor section, including a low pressure compressor. The fan rotor delivers air into a bypass duct defined between the fan case and the core engine. A rigid connection between the fan case and the core engine includes a plurality of H-frame connecting members rigidly connected to the fan case, and to the core engine. The H-frame connecting members each are defined by two rigid legs which extend between the fan case and to the core engine, along directions which are generally parallel to each other. A plurality of non-structural fan exit guide vanes and the non-structural fan exit guide vanes are provided with an acoustic feature to reduce noise. The non-structural fan exit guide vanes are rigidly mounted to at least one of the fan case and the core engine.

In another embodiment according to the previous embodiment, the acoustic feature includes the non-structural fan exit guide vanes are formed with chambers and a covering perforated face sheet.

In another embodiment according to any of the previous embodiments, there are also structural fan exit guide vanes rigidly secured to both the fan case and the core engine. The structural fan exit guide vanes include greater than 0 and less than 55% of a total number of fan exit guide vanes including the non-structural fan exit guide vane.

In another embodiment according to any of the previous embodiments, the structural fan exit guide vanes include 15-30% of the total fan exit guide vanes.

In another embodiment according to any of the previous embodiments, the core engine includes a fan intermediate case forward of the low pressure compressor. The structural fan guide vanes are rigidly connected to the fan intermediate case. The core engine includes a compressor intermediate case intermediate the low pressure compressor and a high pressure compressor. The H-frames are secured to the compressor intermediate case.

In another embodiment according to any of the previous embodiments, there are two of the H-frames.

In another embodiment according to any of the previous embodiments, there are four of the H-frames, with two of the H-frames being aligned at top dead center and bottom dead center and the other two H-frames being generally spaced by 90 degrees from H-frame at top dead center and the H-frame at bottom dead center.

In another embodiment according to any of the previous embodiments, there are four of the H-frames, with two of the H-frames being spaced by 45 degrees from top dead center, and two of the H-frames being spaced by 45 degrees from bottom dead center.

In another embodiment according to any of the previous embodiments, there are two of the H-frames, and two radial struts connecting the fan case to the core engine.

In another embodiment according to any of the previous embodiments, there are two of the H-frames, and two A-frames. Each of the A-frames include a pair of legs rigidly connected at a connection point to the fan case. Each leg in the pair extend away from the connection point in opposed circumferential directions to be connected to the core engine to form an A-shape.

In another embodiment according to any of the previous embodiments, the pair of rigid legs in the plurality of H-frames are spaced from each other by a first distance. The core housing has a diameter at a connection location to the H-frames. The diameter is greater than the distance.

In another embodiment according to any of the previous embodiments, the low pressure compressor has four to six stages.

In another featured embodiment, a gas turbine engine includes a fan rotor driven by a fan drive turbine about an axis through a gear reduction to reduce a speed of the fan rotor relative to a speed of the fan drive turbine. A fan case surrounds the fan rotor, and a core engine with a compressor section, including a low pressure compressor. A plurality of H-frames each are defined by two rigid legs which extend between the fan case and to the core engine, along directions which are generally parallel to each other. The pair of rigid legs in the plurality of H-frames are spaced from each other by a first distance. The core housing has a diameter at a connection location to the H-frames, and the diameter is greater than the distance. A plurality of fan exit guide vanes are rigidly connected to the fan case, and connected to the core engine.

In another embodiment according to any of the previous embodiments, there are structural fan exit guide vanes and non-structural fan exit guide vanes provided with an acoustic feature to reduce noise.

In another embodiment according to any of the previous embodiments, the low pressure compressor has four to six stages.

In another embodiment according to any of the previous embodiments, there are two of the H-frames connecting the fan case to the core engine.

In another embodiment according to any of the previous embodiments, there are four of the H-frames. Two of the H-frames are aligned at top dead center and bottom dead center and the other two H-frames are generally spaced by 90 degrees from H-frame at top dead center and the H-frame at bottom dead center.

In another embodiment according to any of the previous embodiments, there are four of the H-frames. Two of the H-frames are spaced by 45 degrees from top dead center, and two of the H-frames are spaced by 45 degrees from bottom dead center.

In another embodiment according to any of the previous embodiments, there are two of the H-frames, and two radial struts connecting the fan case to the core engine.

In another embodiment according to any of the previous embodiments, there are two of the H-frames, and two A-frames. Each of the A-frames include a pair of legs rigidly connected at a connection point to the fan case. Each leg in the pair extend away from the connection point in opposed circumferential directions to be connected to the core engine to form an A-shape.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 3C shows another embodiment.

FIG. 3D shows another embodiment.

FIG. 3E shows another embodiment.

FIG. 3F shows another embodiment.

FIG. 3G shows a further detail of FIG. 3F.

DETAILED DESCRIPTION

Figure 1:
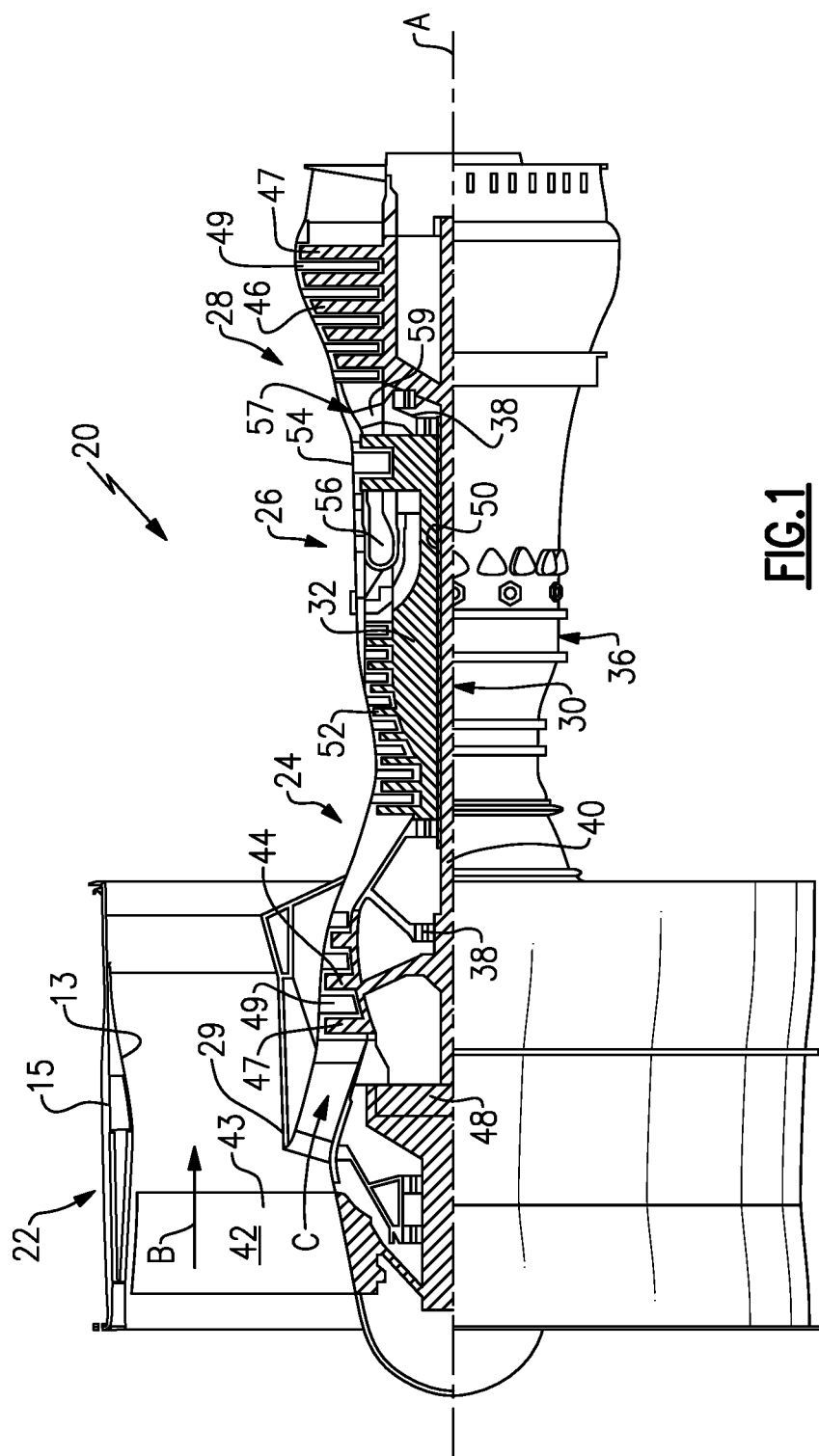
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 38 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ^\circ \text{R})/(518.7^\circ \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a product of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 7.0 and 12.0, or more narrowly is between 10.0 and 11.5. The OPR can be equal to or greater than 44.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
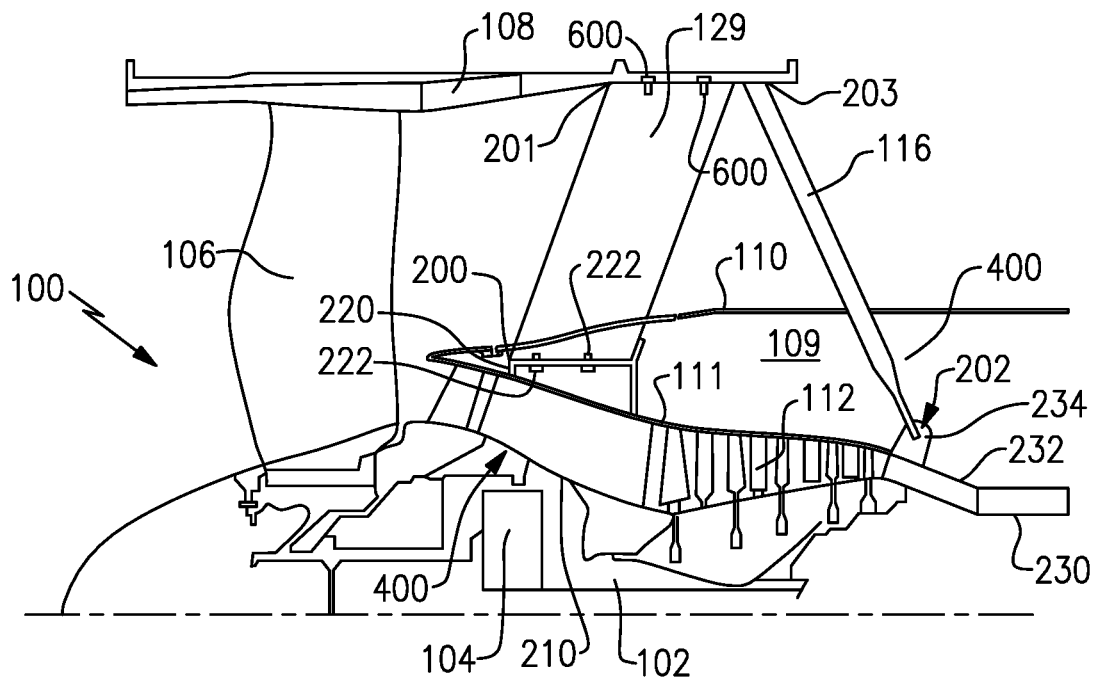
FIG. 2A schematically shows details of the connection between a fan case and an inner core housing.

FIG. 2A shows an engine 100, which may be similar to the engine 20 of FIG. 1. A shaft 102 is driven by a fan drive turbine to drive a fan rotor 106 through a gear reduction 104. The drive connection here may be generally as described above with regard to FIG. 1. A fan case 108 surrounds the fan rotor 106, and an core engine 400 may include a splitter wall 110 that surrounds compressor housing wall 111 which houses a low pressure compressor 112, and a high pressure compressor 230, and combustor and turbine sections (not shown in this Figure). The core engine 400 must be rigidly connected to the fan case 108, to address torque and other loads.

Applicant has previously developed a geared gas turbine engine. In this first generation engine the fan case was connected to the core engine through a plurality of fan exit guide vanes. Each of these fan exit guide vanes were structural elements that provided a load path between the fan case and the core engine.

In engine 100, as will be described below, there are fewer structural fan exit guide vanes 114. Applicant has developed a new type frame connection it calls an H-frame. H-frames 116 have been added to engine 100 to provide additional rigidity.

As shown, the low pressure compressor 112 has five rotating stages. In embodiments the low pressure compressor may have four to six stages, which is longer than the first generation gas turbine engine manufactured by Applicant mentioned above. With such a long low pressure compressor 112, mounting challenges are raised.

Figure 2B:
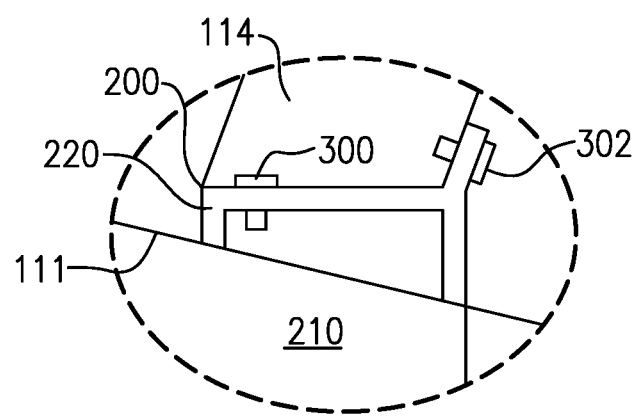
FIG. 2B shows another connection detail.

As can been seen from FIGS. 2A and 2B, the fan exit guide vanes 114/129 extend from an inner point 200 attached at an angle to a radially outer point 201, with the angle having a component in a radially outer direction, and another component in an axially aft direction.

Conversely, the H-frames 116 extend from a radially inner point 202 attached to the core engine 400, radially outwardly at an angle to an outer point 203 connected to the fan case 108. The angle of the H-frame 116 has a component in a radially outer direction and another component in an axially forward direction.

As shown in FIG. 2A, the core engine 400 includes a fan intermediate case 210 including a plurality of struts, and having a mount bracket 220. A non-structural guide vane 129 is attached to the bracket 220 through pins 222. In this manner, the non-structural guide vanes 129 can "float" or adjust radially relative to the bracket 220, but are prevented from moving circumferentially. In other embodiments, the floating connection may be between vanes 129 and fan case 108, with vanes 129 rigidly connected to the core engine. Pins 600 are shown to support that embodiment. Alternatively, the non-structural guide vanes may be fixed to both bracket 220 and to the fan case 108.

FIG. 2B shows a detail of the mount of a structural guide vane 114 to the fan intermediate case 210 and to the bracket 220 through a first pin 300 preventing circumferential movement, and a second pin 302 preventing radial movement.

Returning to FIG. 2A, it can be seen that the H-frames 116 are attached at inner ends 202 at a bracket 234 which is fixed with a compressor intermediate case 232 having a plurality of struts. This view illustrates one strut. The compressor intermediate cases 232 is intermediate the low pressure compressor 112 and a high pressure compressor 230.

Although specific mount locations are shown, other connections between the fan exit guide vanes 114/129 and H-frames 116 to the core engine 400 may be utilized. For purposes of this application, the core engine is defined to include at least the compressor housing wall 111, the fan intermediate case 210, the compressor intermediate case 232, the low pressure compressor 112, the high pressure compressor 230 and a combustor end turbine section, not shown, but which may be as disclosed with regard to FIG. 1.

Figure 3A:
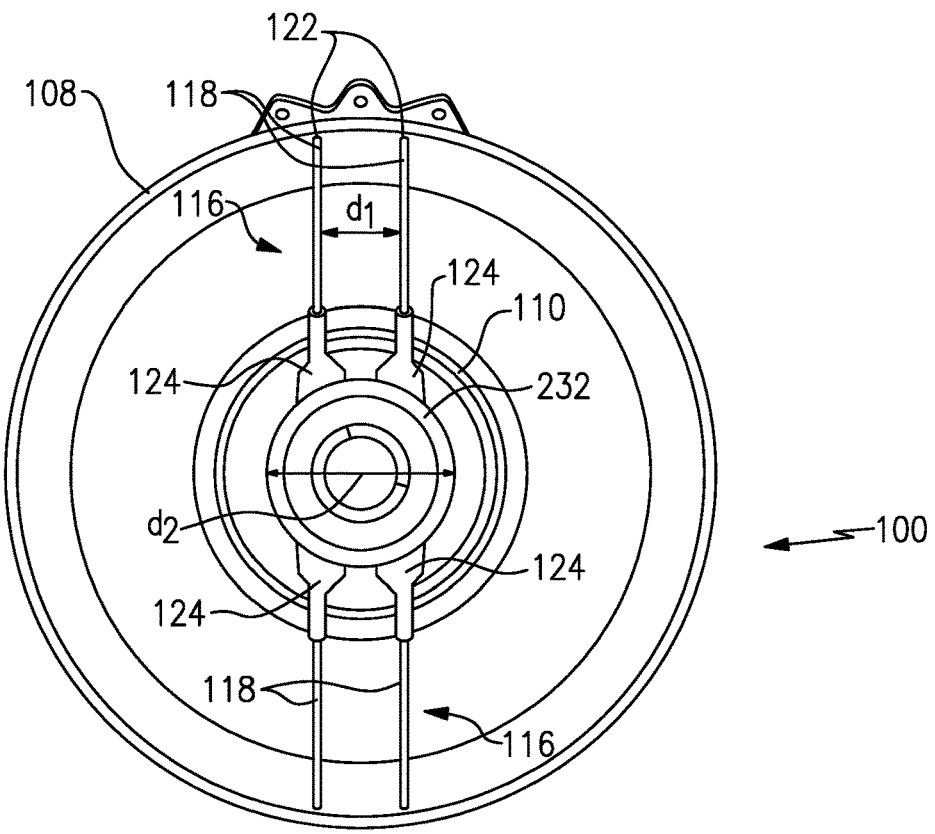
FIG. 3A shows an end view of a gas turbine engine utilizing two H-frames.

As shown in FIG. 3A, the H-frames 116 each comprise two rigid members 118 which extend from a connection point 122 at the fan case 108 inwardly to connection points 124 with the core engine, and here the compressor intermediate case 232.

FIG. 3A shows a connection of the fan case 108 to the inner core engine, and in particular to the compressor intermediate case 232. As can be seen, there are two H-frame connections 116. The term "H-frame" is somewhat inaccurate in there is not a central member interconnecting the two rigid legs 118. Still, Applicant has chosen this nomenclature.

Figure 3B:
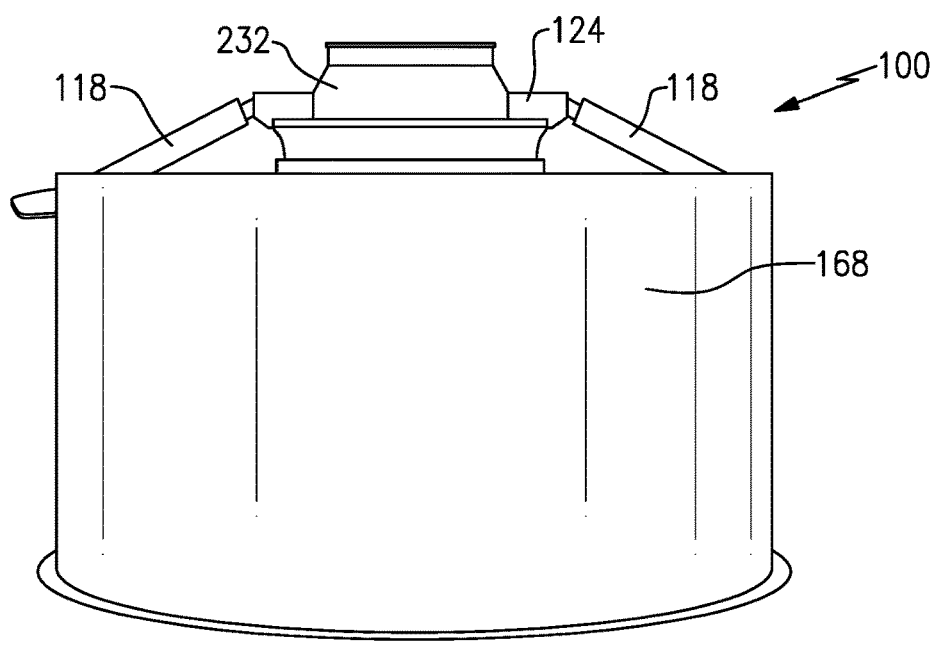
FIG. 3B is a side view of FIG. 3A.

As can be seen in FIG. 3B, the legs 118 and 119 extend axially rearwardly as they move radially inwardly to the connection 124.

The use of H-frames provides good structural support, allowing the use of some non-structural exit guide vanes. Further, they are potentially providing less limiting obstruction to airflow than other types of rigid connections, such as A-frames.

As shown in FIG. 3A, the legs 118 of the H-frames 116 extend generally parallel to each other. For purposes of this application, the term "generally parallel" means that they are within 10 degrees of parallel. In embodiments, they are within 5 degrees, and in further embodiments within 2 degrees of parallel. In one embodiment, they are directly parallel. However, the term "generally parallel" means that they are within 10 degrees.

In addition, there is a distance $d_1$ between the legs 118 of the H-frames 116. A diameter $d_1$ of the inner core engine at the portion of the compressor intermediate case where the legs 118 are connected is greater than $d_2$.

The embodiment shown in FIG. 3A may be circumferentially aligned with bifurcations that also extend between the fan case 108 and the inner core housing (not shown in this Figure).

FIG. 3C shows another embodiment 150 where there are four H-frames 116.

The FIG. 3C H-frames 116 are generally aligned with top dead center 500, and then spaced 90 degrees from that location.

FIG. 3D shows another embodiment having four H-frames 160, however, here the H-frames are clocked 45 degrees away from the location shown in FIG. 3C, but still each separated by 90 degrees. There are two of the H-frames, and two radial struts connecting the fan case to the core engine.

There are four of the FIG. 3D H-frames 116, have two of the H-frames spaced by 45 degrees from top dead center 500, and two of the H-frames being spaced by 45 degrees from bottom dead center 501.

The FIG. 3D embodiment may be selected based upon an analysis of how a particular engine case is likely to deflect under loads.

FIG. 3E shows an embodiment 170 having two H-frames 116, and then lateral radial struts 171. This embodiment provides an even further reduction of obstruction to air than say the FIG. 3A-3D embodiments.

FIG. 3F shows an embodiment 180 having two H-frames 116 at top dead center and bottom dead center, then two A-frames 172 spaced 90 degrees between each of the H-frames 116.

As shown in FIG. 3G, an A-frame 172 includes two rigid legs 174 and 175. These legs extend away from a connection point 196 to the fan case, and in directions with a circumferential component in opposed directions to be attached to the compressor intermediate case 232.

The struts 171 of FIG. 3E and the A-frame legs 174 and 175 of FIG. 3G, also extend in the same general direction between the fan case and the compressor intermediate case, with a component axially rearwardly as it moves radially inwardly.

Figure 4:
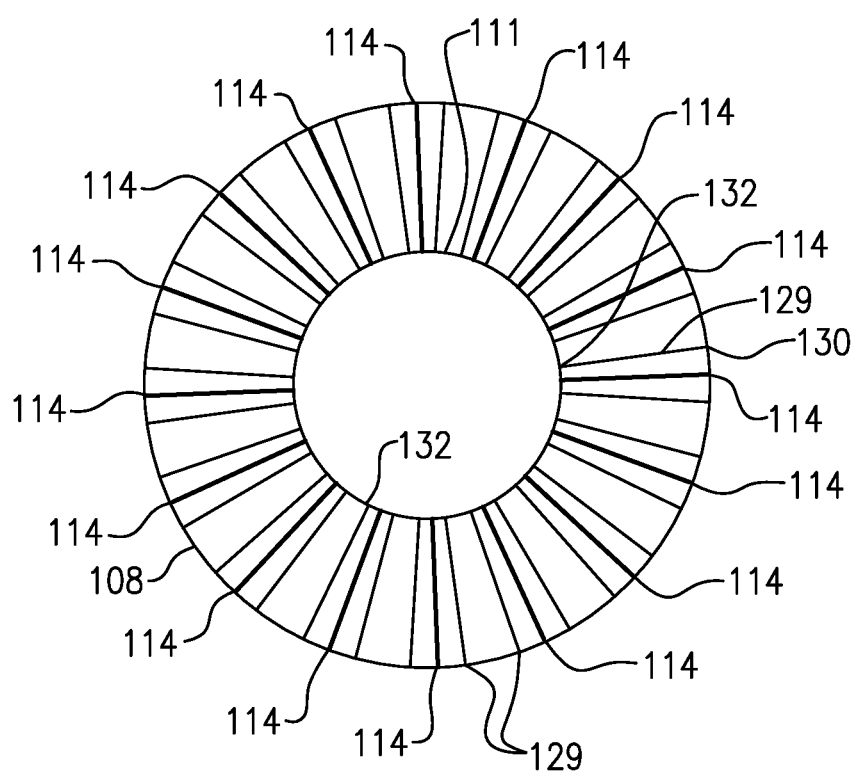
FIG. 4 shows a detail of a plurality of fan exit guide vanes.

As shown in FIG. 4, there are forty-eight fan exit guide vanes total, with sixteen of the fan exit guide vanes being structural vanes 114. Of course, other numbers may be used. Intermediate each structural fan exit guide vane 114 are two non-structural guide vanes 129. The non-structural guide vanes 129 are connected to the fan case 108 at 130, and to the wall 111 at a radially inner point 132. Both connections may be rigidly connected or one may float as mentioned above.

Figure 5:
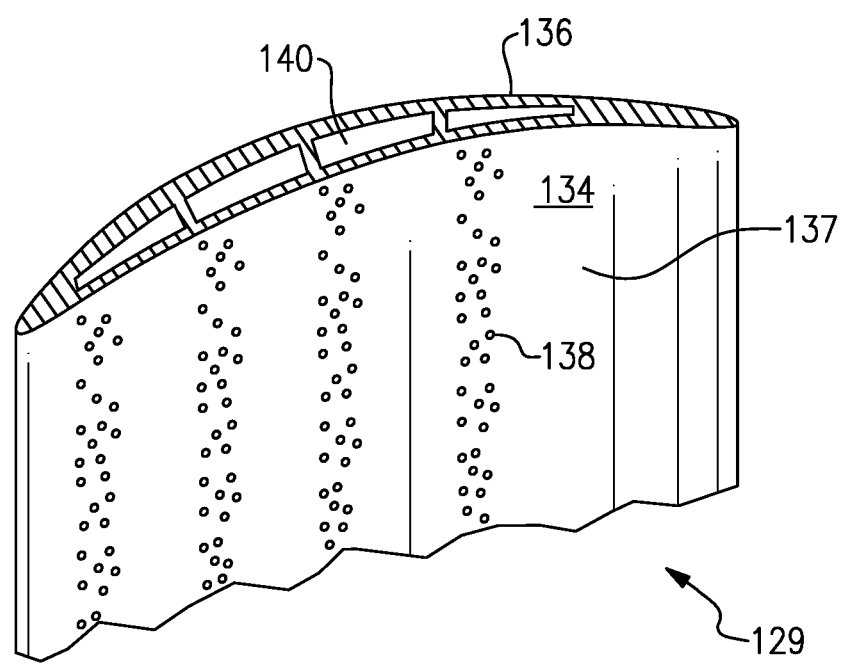
FIG. 5 shows details of one fan exit guide vane.

Since the guide vanes 129 are not structural, they can provide an acoustic function. As shown in FIG. 5, one of the non-structural fan exit guide vanes 129 is illustrated. The guide vane has a pressure wall 134 and a suction wall 136. An outer skin 137 is perforated at 138 and provided over a plurality of chambers 140. The chambers 140 can have any number of shapes including honeycomb, or other cross-sections. The perforations 138 could be circular, but can be other shapes, including elongated slots.

In embodiments the structural guide vanes 114 may include 0% to 55% of the total fan exit guide vanes. In other embodiments the structural fan exit guide vanes 114 may be 15 to 55% of the total fan exit guide vanes. In other embodiments the structural fan exit guide vanes 114 may include 15 to 50% of the total fan exit guide vanes. In yet another embodiment, the structural fan exit guide vanes provide 15 to 30% of the total fan exit guide vanes.

The 0% (and other lower percentages) might be indicated when the engine is core mounted to the aircraft. The higher percentages may be indicated when the engine is fan mounted.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising:
    a fan rotor driven by a fan drive turbine about an axis through a gear reduction to reduce a speed of said fan rotor relative to a speed of said fan drive turbine;
    a fan case surrounding said fan rotor, and a core engine with a compressor section, including a low pressure compressor;
    said fan rotor delivering air into a bypass duct defined between said fan case and said core engine, and a rigid connection between said fan case and said core engine including a plurality of H-frame connecting members rigidly connected to said fan case, and to said core engine, the H-frame connecting members each being defined by two rigid legs which extend between said fan case and to said core engine, along directions which are generally parallel to each other; and
    a plurality of non-structural fan exit guide vanes and said non-structural fan exit guide vanes being provided with an acoustic feature to reduce noise, said non-structural fan exit guide vanes being rigidly mounted to at least one of the fan case and the core engine.

2. The gas turbine engine as set forth in claim 1, wherein said acoustic feature includes said non-structural fan exit guide vanes being formed with chambers and a covering perforated face sheet.

3. The gas turbine engine as set forth in claim 1, wherein there are also structural fan exit guide vanes rigidly secured to both said fan case and said core engine, and said structural fan exit guide vanes include greater than 0 and less than 55% of a total number of fan exit guide vanes including the non-structural fan exit guide vane.

4. The gas turbine engine as set forth in claim 3, wherein said structural fan exit guide vanes include 15-30% of the total fan exit guide vanes.

5. The gas turbine engine as set forth in claim 3, wherein said core engine includes a fan intermediate case forward of said low pressure compressor, and said structural fan guide vanes are rigidly connected to said fan intermediate case, and said core engine including a compressor intermediate case intermediate said low pressure compressor and a high pressure compressor, and said H-frames are secured to said compressor intermediate case.

6. The gas turbine engine as set forth in claim 1, wherein there are two of said H-frames.

7. The gas turbine engine as set forth in claim 1, wherein there are four of said H-frames, with two of said H-frames being aligned at top dead center and bottom dead center and the other two H-frames being generally spaced by 90 degrees from H-frame at top dead center and said H-frame at bottom dead center.

8. The gas turbine engine as set forth in claim 1, wherein there are four of said H-frames, with two of said H-frames being spaced by 45 degrees from top dead center, and two of said H-frames being spaced by 45 degrees from bottom dead center.

9. The gas turbine engine as set forth in claim 1, wherein there are two of said H-frames, and two radial struts connecting said fan case to said core engine.

10. The gas turbine engine as set forth in claim 1, wherein there are two of said H-frames, and two A-frames, wherein each of said A-frames including a pair of legs rigidly connected at a connection point to said fan case, and each leg in said pair extending away from said connection point in opposed circumferential directions to be connected to said core engine to form an A-shape.

11. The gas turbine engine as set forth in claim 1, wherein said pair of rigid legs in said plurality of H-frames being spaced from each other by a first distance, and said core housing having a diameter at a connection location to said H-frames, and said diameter being greater than said distance.

12. The gas turbine engine as set forth in claim 1, wherein said low pressure compressor has four to six stages.

13. A gas turbine engine comprising:
a fan rotor driven by a fan drive turbine about an axis through a gear reduction to reduce a speed of said fan rotor relative to a speed of said fan drive turbine;
a fan case surrounding said fan rotor, and a core engine with a compressor section, including a low pressure compressor;
a plurality of H-frames each being defined by two rigid legs which extend between said fan case and to said core engine, along directions which are generally parallel to each other, wherein said pair of rigid legs in said plurality of H-frames being spaced from each other by a first distance, and said core housing having a diameter at a connection location to said H-frames, and said diameter being greater than said distance; and
a plurality of fan exit guide vanes rigidly connected to said fan case, and connected to said core engine.

14. The gas turbine engine as set forth in claim 13, wherein there are structural fan exit guide vanes and non-structural fan exit guide vanes provided with an acoustic feature to reduce noise.

15. The gas turbine engine as set forth in claim 13, wherein said low pressure compressor has four to six stages.

16. The gas turbine engine as set forth in claim 13, wherein there are two of said H-frames connecting said fan case to said core engine.

17. The gas turbine engine as set forth in claim 13, wherein there are four of said H-frames, with two of said H-frames being aligned at top dead center and bottom dead center and the other two H-frames being generally spaced by 90 degrees from H-frame at top dead center and said H-frame at bottom dead center.

18. The gas turbine engine as set forth in claim 13, wherein there are four of said H-frames, with two of said H-frames being spaced by 45 degrees from top dead center, and two of said H-frames being spaced by 45 degrees from bottom dead center.

19. The gas turbine engine as set forth in claim 13, wherein there are two of said H-frames, and two radial struts connecting said fan case to said core engine.

20. The gas turbine engine as set forth in claim 13, wherein there are two of said H-frames, and two A-frames, wherein each of said A-frames including a pair of legs rigidly connected at a connection point to said fan case, and each leg in said pair extending away from said connection point in opposed circumferential directions to be connected to said core engine to form an A-shape.

* * * * *